(12) United States Patent
Esnault

(10) Patent No.: US 12,055,269 B2
(45) Date of Patent: Aug. 6, 2024

(54) TANK FOR STORING ENERGY IN THE FORM OF PRESSURIZED GAS, MADE OF ULTRA-HIGH PERFORMANCE FIBRE REINFORCED CONCRETE

(71) Applicant: IFP Energies nouvelles, Rueil-Malmaison (FR)

(72) Inventor: Vivien Esnault, Rueil-Malmaison (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 199 days.

(21) Appl. No.: 17/633,224

(22) PCT Filed: Oct. 12, 2020

(86) PCT No.: PCT/EP2020/078645
§ 371 (c)(1),
(2) Date: Feb. 7, 2022

(87) PCT Pub. No.: WO2021/078568
PCT Pub. Date: Apr. 29, 2021

(65) Prior Publication Data
US 2022/0325852 A1 Oct. 13, 2022

(30) Foreign Application Priority Data
Oct. 24, 2019 (FR) ..................... 1911888

(51) Int. Cl.
*F17C 1/08* (2006.01)
(52) U.S. Cl.
CPC ........ *F17C 1/08* (2013.01); *F17C 2201/0119* (2013.01); *F17C 2201/052* (2013.01);
(Continued)

(58) Field of Classification Search
CPC ................ F17C 1/08; F17C 2201/0119; F17C 2201/052; F17C 2203/012;
(Continued)

(56) References Cited

U.S. PATENT DOCUMENTS

| 2009/0178590 A1* | 7/2009 | Mitchell | ................. | C04B 28/02 106/644 |
| 2011/0099940 A1* | 5/2011 | Yang | ......................... | F17C 1/08 52/745.01 |

(Continued)

FOREIGN PATENT DOCUMENTS

| DE | 102012100981 A1 | 8/2013 |
| FR | 3055942 A1 | 3/2018 |

OTHER PUBLICATIONS

International Search Report for PCT/EP2020/078645 dated Jan. 19, 2021; 5 pages.
Written Opinion of the International Searching Authority for PCT/EP2020/078645 dated Jan. 19, 2021; 7 pages.

*Primary Examiner* — Shawn M Braden
(74) *Attorney, Agent, or Firm* — FITCH, EVEN, TABIN & FLANNERY LLP

(57) ABSTRACT

The present invention is a tank for storing pressurized gas. The tank comprises at least one tubular element (1) having a wall comprising a layer of prestressed concrete (6), at least one circumferential mechanical reinforcing layer (8), at least one axial mechanical reinforcing layer (7) and a sealing layer (5). The concrete from which the layer of prestressed concrete is made is chosen from ultra high performance fiber-reinforced concretes.

19 Claims, 5 Drawing Sheets

(52) U.S. Cl.
CPC ...... *F17C 2203/012* (2013.01); *F17C 2203/0624* (2013.01); *F17C 2203/0639* (2013.01); *F17C 2203/0656* (2013.01); *F17C 2203/0678* (2013.01); *F17C 2223/0123* (2013.01); *F17C 2260/011* (2013.01)

(58) Field of Classification Search
CPC ...... F17C 2203/0624; F17C 2203/0639; F17C 2203/0656; F17C 2203/0678; F17C 2223/0123; F17C 2260/011; F17C 1/12; F17C 13/12; F17C 2201/0157; F17C 2260/042; F17C 2270/0134; F17C 1/007; F17C 2203/066; F17C 1/00; F17C 2201/0104; F17C 2201/032; F17C 2201/035; F17C 2203/0304; F17C 2203/0604; F17C 2203/0695; F17C 2221/031; F17C 2223/035; F17C 2227/0157; F17C 2260/012; F17C 2270/0147; Y02E 60/16
See application file for complete search history.

(56) References Cited

U.S. PATENT DOCUMENTS

| | | | | |
|---|---|---|---|---|
| 2011/0309074 | A1* | 12/2011 | Thunhorst | F17C 1/16 |
| | | | | 220/660 |
| 2015/0323104 | A1* | 11/2015 | Subacchi | F16L 9/085 |
| | | | | 138/109 |
| 2021/0278044 | A1* | 9/2021 | Saeedi | F17C 1/06 |
| 2022/0333718 | A1* | 10/2022 | Esnault | F16L 59/147 |

\* cited by examiner

TANK FOR STORING ENERGY IN THE FORM OF PRESSURIZED GAS, MADE OF ULTRA-HIGH PERFORMANCE FIBRE REINFORCED CONCRETE

CROSS-REFERENCE TO RELATED APPLICATIONS

This application claims priority from International Patent Application No. PCT/EP2020/078645 filed Oct. 12, 2020, which claims priority from French Application No. 19/11.888 filed Oct. 24, 2019, which are hereby incorporated herein by reference in their entirety.

BACKGROUND OF THE INVENTION

Field of the Invention

The present invention relates to the field of storing energy in the form of pressurized gas, in particular large-volume containers for storing pressurized gas, as are used for compressed-air energy storage of the AACAES ("Advanced Adiabatic Compressed Air Energy Storage") type, in which the storage of air and the storage of heat generated independently are provided.

Description of the Prior Art

A compressed-air energy storage system (also referred to as ACAES, which stands for "Adiabatic Compressed Air Energy Storage") seeks to store energy in the form of compressed air, with a view to subsequent use. For storage, energy, notably electrical energy, drives air compressors and, for recovery, the compressed air drives turbines, which may be connected to an electric generator.

Different variants of compressed-air energy storage systems exist which have the objective notably of improving the efficiency of such systems. Particular mention may be made of the following systems and methods:
  ACAES (which stands for "Adiabatic Compressed Air Energy Storage"), in which the air is stored at the temperature caused by the compression.
  AACAES (which stands for "Advanced Adiabatic Compressed Air Energy Storage"), in which the air is stored at ambient temperature, and the heat caused by the compression is also stored, separately, in a Thermal Energy Storage (TES) system. In this case, the heat stored in the TES is used to warm the air before it is expanded.

Compressed-air energy storage systems of the above type require one or more tanks which are at least both resistant to the storage pressure and impermeable to the gas employed (air). Resistance to pressure is notably a significant concern because the compressed-air storage pressures are at least equal to 100 bar in the last stage of the AACAES system, which has the highest pressure.

It is conventional to use tanks made entirely of steel for resisting an internal pressure. This is because steel has both impermeability and pressure-resistance properties. However, while impermeability is ensured upwards of relatively small steel thicknesses (a few mm), it is necessary to use much greater steel thicknesses when a fluid is to be stored at high pressure (that is to say at a pressure greater than 100 bar, and preferably around 125 bar). For example, a cylindrical tank with a diameter of 56" (1422.4 mm) needs to have a minimum wall thickness of 33.5 mm in order to resist an internal pressure of 125 bar (calculated according to the CODAP standard for a steel grade X80).

While an all-steel tank is a technically and economically advantageous solution for small volumes at high pressure, an all-steel tank becomes inconceivable in the case of large volumes at high pressure. Specifically, not only does the cost of the steel have a highly detrimental effect on the economic viability of the system, but also the design of such a tank gives rise to significant manufacturing constraints. This is because the greater the diameter of a spherical or cylindrical storage tank, the greater the wall thickness needed in order to withstand the pressure. For large storage volumes, manufacturing, and especially welding, an element with a very large thickness is not always achievable. In this case, a large volume is stored by assembling several smaller sized elements, which are coupled together. Since they have smaller dimensions, these elements are technically manufacturable and thus the manufacturing constraints are overcome. On the other hand, the economic viability of the system may be jeopardized on account of the quantity of steel needed and the assembly costs.

In order to replace all-steel tanks, tanks formed of several layers, notably of concrete and of steel, have been developed.

For example, the patent application FR 3055942 (WO 2018050455) describes a tank comprising a sealing layer of steel, and a mechanical strength layer made of concrete prestressed by metal wires under tension.

SUMMARY OF THE INVENTION

The inventor discovered that, although this tank had an advantage compared with all-steel tanks, it presented risks of bursting while in service. This is because the fragile behavior of concretes makes the tank described in the document FR 3055942 prone to explosive rupture of its wall (for example in the event of failure of a metal wire under tension). This risk may have potentially dramatic consequences given the extremely large volumes and pressures.

To overcome these drawbacks, the present invention improves the tanks made of concrete prestressed by a layer of steel by using a particular concrete: ultra-high performance fiber-reinforced concrete (UHPFRC), also known as ultra-high performance concrete (UHPC).

The use of UHPC concrete makes it possible to increase the resilience of the compressed-gas tank. Specifically, the chamber of the tank may be dimensioned to resist numerous scenarios likely to ruin the structure of accidental overpressure in the tank, failure of one or more prestressed elements, failure of the sealing layer causing the pressurization of the internal porosity of the concrete, a thermal contrast between the inside and the outside of the tank brought about by exceptional climatic conditions or production incidents. From this point of view, the layer of prestressed concrete made of UHPC has a much better capacity to survive without being ruined under these different loadings. Moreover, the inventors have demonstrated that the use of UHPC makes it possible to obtain behavior of the layer of concrete which can deform as far as creating cracks that allow the pressurized gas to leak, but without exploding.

Furthermore, despite the fact that UHPC concrete is extremely expensive, not very commonly used, and requires specific tools and conditions to be employed, the use of UHPC concrete proves to be competitive from an economic point of view for producing compressed-gas tanks for an energy storage application, according to the invention. Specifically, the fact that the cost of UHPC is much greater than that of conventional concrete, it is intended to be used to produce very high added value structures, and it is complex to employ, means that the use of UHPC is not encouraged. However, surprisingly, as shown below, the mechanical characteristics of UHPC concrete for producing a compressed-gas tank for an energy storage application make it possible to considerably reduce the thickness of the layer of concrete, and, to a lesser extent, the quantity of steel used to prestress the layer of concrete. Thus, the use of UHPC concrete makes it possible to produce a compressed-gas tank at a compatible cost for an energy storage application, while continuing to ensure the highest possible standards in respect of the safety and durability of the system.

The present invention relates to a tank for storing a pressurized gas, such as compressed air, the tank comprising at least one tubular element having a wall having a layer of prestressed concrete, at least one circumferential mechanical reinforcing layer and a sealing layer. The tank is characterized in that the concrete that makes up the layer of prestressed concrete is chosen from ultra-high performance fiber-reinforced concretes.

According to one embodiment of the invention, the concrete that makes up the layer of prestressed concrete may be chosen from ultra-high performance fiber-reinforced concretes defined by the standard NF P18-470. For example, the concrete that makes up the layer of prestressed concrete is chosen from ultra-high performance fiber-reinforced concretes having metal fibers made of steel and exhibiting a standardized compressive strength greater than 150 MPa. Preferably, the concrete that makes up the layer of prestressed concrete is chosen from ultra-high performance fiber-reinforced concretes having metal fibers made of steel and exhibiting a tensile behavior defined as exhibiting at least limited strain hardening within the meaning of NF P18-470 (class T2), preferably defined as exhibiting significant strain hardening within the meaning of NF P18-470 (class T3).

According to one embodiment of the invention, the concrete that makes up the layer of prestressed concrete may be chosen from ultra-high performance fiber-reinforced concretes that meet at least one of the following criteria:
  the prestressed concrete has fines of different sizes, the maximum size of the fines being less than 7 mm, preferably less than 1 mm, and the content of fines having a grain size d50<5 μm being at least greater than 50 kg/m$^3$ of concrete;
  a content of cement of between 700 and 1000 kg/m$^3$ of concrete;
  a water/cement mass ratio of between 0.15 and 0.25;
  a content of additives, in the form of solids, of between 10 and 35 kg/m$^3$ of concrete; and
  a content of fibers of between 2% and 10% by volume.

According to one embodiment of the invention, the circumferential mechanical reinforcing layer may be made up of circumferential metal elements disposed around or in the layer of prestressed concrete, the circumferential metal elements being under tensile prestress. The circumferential metal elements may be chosen from metal wires, metal bands, metal rings, and metal cables.

According to one embodiment of the invention, the wall may also have a protective layer disposed on the external surface of the layer of prestressed concrete with the circumferential mechanical reinforcing layer being able to be embedded in the protective layer.

According to one embodiment of the invention, the wall may also have at least one axial mechanical reinforcing layer made up of one or more longitudinal metal elements disposed in the layer of prestressed concrete with one or more longitudinal metal elements being under tensile prestress. The one or more longitudinal metal elements may be chosen from a metal tube, metal wires, metal cables or metal bands.

According to one embodiment of the invention, the sealing layer may be chosen from a layer of metal, in particular of steel, a layer of polymer, in particular of polytetrafluoroethylene, or a juxtaposition of an internal sublayer of concrete and an external sublayer of metal, in particular of steel, or of polymer, in particular of polytetrafluoroethylene.

According to one embodiment of the invention, at least the layer of prestressed concrete and the circumferential metal reinforcing layer and, optionally, the axial metal reinforcing layer, if it is present, are dimensioned such that the tank can withstand a pressure at least greater than 100 bar and has an interior volume at least greater than 1000 m3.

The invention also relates to a system for storing and recovering energy using compressed gas, having at least one means of compressing gas, at least one tank for storing pressurized gas according to the invention, and at least one means for expanding the compressed gas to generate energy.

The invention also relates to a method for storing and recovering energy using compressed gas, wherein the following steps are carried out:
  a) a gas is compressed;
  b) optionally, the compressed gas is cooled by exchange of heat in a heat storage;
  c) the optionally cooled gas is stored in a tank for storing a pressurized gas according to the invention;
  d) optionally, the cooled compressed gas is warmed by restitution of the heat in the heat storage; and
  e) the optionally warmed compressed gas is expanded to generate energy.

Further features and advantages of the method according to the invention will become apparent from reading the following description of nonlimiting exemplary embodiments, with reference to the appended figures described below.

DETAILED DESCRIPTION OF THE INVENTION

The present invention relates to a closed tank for storing a pressurized gas. The tank may contain notably a pressurized gas, for example compressed air. However, the tank is suitable for any pressurized gas.

The tank comprises a main section closed on either side by a base and a cover. The main section forms the lateral wall of the tank and may have a substantially tubular shape, which may extend along a rectilinear axis. The main section may be in the form of a tube, for example with a section of circular shape, or a polygonal, for example octagonal, shape. The interior of the main section limits the storage volume for the pressurized fluid. The main section is made up of one or more tubular portions that are assembled end-to-end by connections. The base and the cover are each fitted to a tubular portion by connections. The connections create a sealed connection between two tubular portions, and between the base and a tubular portion, and between the cover and a tubular portion. The base and the cover of the tank conventionally have orifices for at least one of the injection and/or withdrawal of the pressurized gas. Away from the orifices for the injection and/or withdrawal of the gas, the tank is closed. For certain applications of the tank, the tank may contain heat storage particles, for storing the heat contained in the gas. Thus, it is possible to carry out more efficient energy storage.

Figure 1:
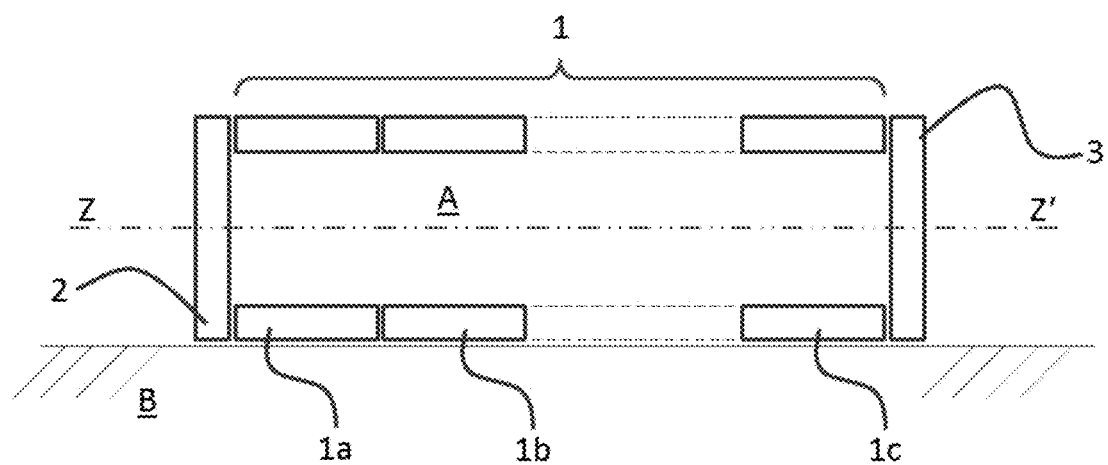
FIG. 1 schematically illustrates a pressurized-fluid tank according to one embodiment of the invention.

FIG. 1 schematically illustrates in a nonlimiting manner a tank according to one embodiment of the invention. The tank has a main section 1 delimiting a storage volume A for storing the pressurized gas and optionally heat storage particles. The main section 1 has a tubular shape which extends along the straight axis ZZ'. With reference to FIG. 1, the main section 1 of the tank has a cylindrical shape, of circular section. The main section 1 is made up of cylindrical portions 1a, 1b, . . . 1c. The portions are assembled end-to-end, in a sealed manner, for example by welding. At one of its ends, the main section 1 is closed by a base 2. At its other end, the main section 1 is closed by a cover 3. To simplify the figure, the base 2 and the cover 3 are depicted flat. However, they may have different shapes, notably hemispherical shapes. For the embodiment shown in FIG. 1, the tank is disposed lying on the ground B. Alternatively, the tank may be partially or entirely buried in the ground B or be disposed vertically.

In order to be able to be used as a tank system for storing energy in the form of compressed gas, the tank according to the invention may have a storage volume greater than 1000 m$^3$, for example between 2000 m$^3$ and 10 000 m$^3$. For example, the tank is made up of a main section with a length of 500 m to 2000 m and a cylindrical tube with an inside diameter of 1 to 4 m.

The operation of storing the pressurized gas, in particular the pressurized air, may be carried out over cycles of several hours (2 h to 20 h, preferably 5 h to 20 h) or several days (for example 1 to 5 days). During a cycle, the pressure varies between a low pressure of between 40 and 80 bar, preferably between 60 and 80 bar, and a high pressure greater than 100 bar (for example between 100 and 150 bar, preferably between 115 and 135 bar). Typically, an example of a tank according to the invention has a storage capacity of 5000 m3, created by a tube assembly with an inside diameter of 2 m, along a length of 1000 m. This tank may operate between a low pressure of about 75 bar and a high pressure of about 125 bar, in order to store energy in the form of compressed air corresponding to an electric power of around 10 MW over several hours.

The main section of the tank according to the invention is formed by a juxtaposition of concentric layers having specific functions. These layers are juxtaposed and concentric since they are disposed one around another without a free space between one another. In other words, the inside diameter (or the distance from the center of the tank in the case of a noncircular section) of an external layer corresponds to the outside diameter (or the distance from the center of the tank in the case of a noncircular section) of an internal layer adjacent to the external layer. A layer forms a continuous wall having the shape of the main section.

According to the invention, the main section has:
- A layer of prestressed concrete, the concrete being chosen from ultra-high performance fiber-reinforced concretes (UHPC),
- A circumferential mechanical reinforcing layer. Generally, the circumferential mechanical reinforcing layer is made up of circumferential metal elements disposed around or in the layer of prestressed concrete. The circumferential metal elements may take several forms, for example metal wires, metal cables, metal bands, metal rings. The metal elements are under tensile prestress and therefore impose a circumferential compressive prestress in the layer of concrete at least when the tank is at rest (that is to say when it does not contain pressurized gas).
- Optionally, an axial mechanical reinforcing layer. Generally, the axial mechanical reinforcing layer has one or more longitudinal metal elements which extend along the axis of the tank and which are disposed in the layer of prestressed concrete and along the axis. The one or more longitudinal metal elements may take different forms, for example a metal tube, metal wires, metal cables or metal bands. The one or more longitudinal metal elements are disposed within the layer of concrete. In other words, said one or more longitudinal metal elements are embedded within the UHPC concrete. The one or more longitudinal metal elements are under tensile prestress and therefore impose a compressive prestress in the direction of the axis of the tank in the layer of prestressed concrete at least when the tank is at rest.
- Optionally, a protective layer for protecting the external surface of the tank is made for example from a regular concrete, a cement mortar, asphalt, or a polymer covering.
- A sealing layer, which ensures the gastightness of the tank which is made for example from steel or polymer.

In the rest of the description, different embodiment variants of the different layers of the main section are described in detail. These variants may be combined with one another so as to combine their effects.

Layer of Prestressed Concrete

The layer of prestressed concrete allows resistance to the pressure, and to the variations therein over time, of the pressurized gas in the tank.

According to the invention, the concrete that makes up the layer of prestressed concrete is chosen from ultra-high performance fiber-reinforced concretes (UHPFRC), also known as ultra-high performance concretes (UHPC). UHPCs are concretes, including materials which are formed by mixing cement, sand, gravel and water, adjuvants, additives and preferably metal fibers, and the properties of which develop by hydration.

The ultra-high performance fiber-reinforced concretes (UHPC) employed by the present invention may be defined by the standard NF P18-470. UHPCs are defined therein as being "concretes characterized by high compressive strength, greater than 130 MPa, beyond the range of application of the standard NF EN 206/CN:2014, by high post-cracking tensile strength making it possible to achieve ductile tensile behavior and the absence of brittleness which makes it possible to calculate and realize structures and structural elements without using reinforced concrete reinforcements". Of course, UHPCs can be used with reinforced concrete reinforcements or prestressing reinforcements.

More specifically, according to one embodiment of the invention, an ultra-high performance fiber-reinforced concrete (UHPC) of class UHPC-S within the meaning of the standard NF P18-470 are chosen, namely:

- A UHPC having steel fibers. Thus the UHPC exhibits post-cracking strength properties which are conferred by steel fibers. The steel fibers may be defined as being "straight or deformed pieces of cold-drawn steel wire, straight or deformed cut sheet fibers, melt extracted fibers, shaved cold-drawn wire fibers and fibers milled from steel blocks". The steel fibers may have the following geometric dimensions: diameter of 0.1 to 0.3 mm and a length of between 10 and 20 mm.
- A UHPC having a compressive strength greater than 150 MPa, measured according to the standard NF EN 12390-3:2012.

Preferably, a UHPC of tensile behavior class T2 (exhibiting limited strain hardening) or T3 (exhibiting significant strain hardening), according to the standard NF P18-470, will be chosen.

According to one embodiment of the invention, a UHPC having a composition that meets the following criteria, on their own or in combination, may be chosen:

- The UHPC comprises fines of different sizes, the maximum size of the fines is less than 7 mm, preferably less than 1 mm. Thus, the UHPC is characterized by an upper size limit for the fines used: maximum size of 7 mm, preferably maximum size of 1 mm.
- A content of cement of between 700 and 1000 kg/m³ of concrete, that is a very high content of cement. Preferably, a cement of grade 52.5 defined by the standard NF EN 197-1 will be used.
- The UHPC has a content of very fine particles exhibiting a grain size distribution d50<5 μm of at least 50 kg/m³ of concrete. Thus, the UHPC has a granular skeleton optimized on several scales to promote the compactness of the stack. The formulations are based, for this, on additions of very fine particles (d50<50 μm) such as silica fume, ultrafine silica or lime fillers.
- A very small water content: a water/cement mass ratio of between 0.15 and 0.25.
- A high content of additives, in particular superplasticizers: a content of additives of between 10 to 35 kg in the form of solids per m³ of concrete.
- A content of fibers, for example metal or polymer fibers, preferably metal fibers, for example steel fibers, at high contents: between 2% and 10% by volume.

According to one exemplary embodiment of the invention, a UHPC that complies with the following composition can be chosen (of course, the composition is given during the preparation of the UHPC or in other words during mixing):

- Cement (for example of class 52.5 or similar): 700 to 1000 kg/m³
- Fine, silica or lime sand, having particle sizes<1 mm: 800 to 1200 kg/m³
- Fine (d50 between 10 and 50 μm), silica or lime mineral filler: 150 to 250 kg/m³
- Ultrafine (d50<5 μm) or nanometric mineral filler (for example chosen from silica fume, lime or silica microfiller): 50 to 250 kg/m³
- Metal or polymer fibers (diameter 0.1 to 0.3 mm, length 10 to 20 mm): 2 to 10% by volume
- Plasticizing or superplasticizing adjuvants: 10 to 35 kg/m³ (solids)
- Total water: between 15 and 25% by mass of the quantity of cement Compositions 1 and 2 are given by way of example:

TABLE 1

|  | Composition 1 | Composition 2 |
|---|---|---|
| Cement 52.5 R | 750 kg | 1075 kg |
| Fine sand | 1,020 kg | 1,050 kg |
| Ground quartz | 200 kg | 160 kg |
| Silica fume | 230 kg | 50 kg |
| Metal fibers | 160 kg | 220 kg |
| Superplasticizer (solids) | 10 kg | 35 kg |
| Water | 140 L | 200 L |

The layer of prestressed concrete is formed of a prestressed concrete. The prestress is applied to the UHPC concrete by means of the circumferential mechanical reinforcing layer and optionally by the axial mechanical reinforcing layer.

The choice of UHPC concrete to produce the tank according to the invention makes it possible to increase the resilience of the compressed-gas tank. The layer of prestressed concrete made of UHPC has a much better capacity to survive without being ruined under abnormal loadings. This is because regular concretes have what is known as a "brittle" behavior, which allows explosive rupture of the layer of concrete, for example if a longitudinal or axial metal element fails, or in the event of an impact with the exterior surface of the tank. The consequences of explosive rupture of the layer of concrete would be dramatic given the extremely large volumes and pressures applied during operation of the tank according to the invention. Regular concrete is understood as being a concrete within the meaning of the standard NF EN 206, having a characteristic compressive strength less than 100 MPa, and without addition of fibers for giving it ductile properties.

Moreover, the choice of UHPC concrete makes it possible to increase the resilience of the tank according to the invention. This is because the layer of UHPC concrete has a capacity to deform as far as creating cracks that allow the pressurized gas to leak, but without exploding. Specifically, the fibers, and the composition of the UHPC concrete allow the concrete to deform until cracks occur, without ruining the structure since the fibers maintain the structure and its mechanical strength capacity even after cracks occur.

Furthermore, the choice of a UHPC concrete to produce the layer of prestressed concrete makes it possible to maintain the mechanical integrity of the tank according to the invention better over time. This is because UHPC concretes exhibit excellent fatigue resistance and creep resistance compared with regular concrete, which is well suited to supporting significant mechanical stresses, cyclically and accompanied by temperature variation, this being inherent to the use for which the tank according to the invention is intended: storing energy in the form of pressurized gas.

According to one embodiment, the layer of prestressed concrete can also provide a sealing function. This is because the choice of UHPC concrete to produce the tank according to the invention exhibits permeability much less (around 100 times less) than that of regular concretes. Thus, the layer of prestressed UHPC concrete may be satisfactory for ensuring partial impermeability to the gas contained in the tank. Thus, the sealing capacity of the layer of prestressed UHPC concrete allows the possibility of failure or partial deterioration of the sealing layer and makes it possible to limit restoration operations thereon.

On account of its high mechanical properties, the use of UHPC concrete makes it possible to envision relatively thin walls for the tank (around 4 times thinner according to some estimates). Given the high cost of the material, this is a significant point for the economic viability of the invention. This question becomes particularly critical in the case in which failure of the sealing layer is envisioned. In this case, the pressurized air contained in the tank invades the porosity of the concrete, causing tensile stresses of poromechanical origin that are liable to damage the material. This type of fault is unstable and liable to bring about sudden rupture of the shell. If the integrity of the sealing layer cannot be 100% guaranteed (this being likely given the levels of risk associated with this type of tank), it is appropriate to configure the prestress exerted on the concrete so as to ensure that the material is never subjected to tensile loads, even in the event that the sealing layer is compromised. With conventional concrete, this criterion proves to be particularly constraining, bringing about extremely large oversizes in terms of concrete thickness and section of prestressing cables, around 60% thicker according to some estimates. The oversize is much smaller when UHPC is used (around 20% thicker) on account of the greater compressive strength of the material, which makes it more capable of supporting significant prestresses.

Besides consuming less material, the thinner walls of a tank made of UHPC have an advantage with regard to resistance to stresses of thermal origin. This is because, when the tank is used to store compressed air, the loading/offloading cycles of the tank will vary the internal temperature significantly (several tens of ° C.), and in a manner not correlated with the outside temperature to which the external wall is subjected. However, a thermal gradient between the two walls is liable to bring about cracking of the concrete on the cold wall, inasmuch as the thermal contraction of the material on the wall is prevented by the rest of the structure, which is hotter. A particularly critical case for the application here relates to the filling of the tank (which causes the tank to be pressurized and the internal temperature to increase), while at the same time the outside temperature is low, or drops suddenly. In the case of a tank made of regular concrete, the wall is too thick to allow equalization of the temperatures between the internal and external faces, and the thermal gradients generated are significant. It is possible guard against the cracking of the material on the external face by ensuring the presence of an external layer acting as a thermal insulator, without any structural role. This role may optionally be fulfilled by the protective layer mentioned in this invention, if it proves to be sufficiently thick with respect to the temperature differences in question. In the case of a tank made of UHPC, besides the abovementioned better resistance of the material to tensile stresses, the thinner wall allows much better conduction of the temperature, which limits the differences in temperature between the internal and external faces. Thus, for a tank having a wall made of UHPC concrete according to the invention, the stresses of thermal origin are largely limited and without risk for the integrity of the material.

Circumferential Mechanical Reinforcing Layer

Generally, the circumferential mechanical reinforcing layer is made up of circumferential metal elements disposed around or in the layer of prestressed concrete. The circumferential metal elements may take several forms, for example metal wires, metal cables, metal bands, metal rings.

According to one embodiment of the invention, the circumferential tensile prestress can be obtained by winding circumferential metal elements under tension around the tube of concrete, for example winding metal wires, cables or bands. According to another embodiment, the circumferential metal elements are fitted in sheaths made in the tube of concrete during the casting thereof, prestressed and then secured to the tube of concrete by injecting a cement slurry which fills the space left in the concrete sheath. Preferably, the circumferential metal elements are disposed at the periphery of the layer of prestressed concrete, that is to say around and in contact with the latter.

Alternatively, the circumferential metal elements may be embedded in the layer of prestressed concrete. In this case, the circumferential metal elements are disposed preferably in the half (the half is defined by the part obtained by delimiting the tube formed by the layer of prestressed concrete in two halves corresponding to two concentric, superposed tubes of identical thickness) of the layer of prestressed concrete situated toward the outside of the tank.

The circumferential metal elements are under tensile prestress and therefore impose a circumferential compressive prestress in the layer of concrete at least when the tank is at rest (that is to say when it does not contain pressurized gas). Thus, the circumferential mechanical reinforcing layer made up of the circumferential metal elements has the role of reducing the circumferential stress supported by the layer of concrete when the tank according to the invention is put into service. Moreover, the circumferential mechanical reinforcing layer made up of the circumferential metal elements has the role of keeping the layer of concrete under compressive stress over the greatest range of internal pressure loading of the tank, making it possible to benefit to the maximum from the excellent compressive strength characteristics of the concrete and therefore to minimize the thickness of the layer of concrete. The application of a circumferential tensile prestress therefore makes it possible to engineer a tank for storing a pressurized gas with a smaller thickness of concrete than would be needed if no prestress were applied. This is because the prestress subjects the layer of concrete to compressive loads, to which the UHPC concrete material is very resistant.

Preferably, the circumferential metal elements are made of metal, preferably of steel. Advantageously, the circumferential metal elements may be distributed regularly in or on the layer of concrete, in order to apply a uniform prestress to the layer of concrete.

Axial Mechanical Reinforcing Layer

It will be recalled that this is an optional layer in the design of the main section of the tank. Nevertheless, a tank according to the invention having an axial mechanical reinforcing layer is a preferred embodiment of the invention, which allows the main section to react to the loads exerted by the pressurized gas on the base and the cover of the tank.

Generally, the axial mechanical reinforcing layer has one or more longitudinal metal elements which extend along the axis of the tank and which are disposed in the layer of prestressed concrete and along the axis of the tank. The one or more longitudinal metal elements may take different forms, for example a metal tube, metal wires, metal cables or metal bands.

The one or more longitudinal metal elements are disposed within the layer of concrete. In other words, the one or more longitudinal metal elements are embedded within the UHPC concrete.

The longitudinal metal elements are disposed preferably on or in the vicinity of the median plane of the layer of prestressed concrete (the median plane is defined as being the plane equidistant from the internal surface and the external surface of the tube). According to one embodiment, the longitudinal metal elements are disposed and distributed in two tubular planes, the diameters of which are inscribed in the layer of prestressed concrete.

Said one or more longitudinal metal elements are under tensile prestress and therefore impose a compressive prestress in the direction of the axis of the tank in the layer of prestressed concrete at least when the tank is at rest.

Thus, the axial mechanical reinforcing layer made up of the one or more longitudinal metal elements has the role of reducing the axial stress supported by the layer of concrete when the tank according to the invention is under high pressure. Moreover, the axial mechanical reinforcing layer made up of the one or more longitudinal metal elements has the role of keeping the layer of concrete under compressive stress over the greatest range of internal pressure loading of the tank, making it possible to benefit to the maximum from the excellent compressive strength characteristics of the concrete and therefore to minimize the thickness of the layer of concrete.

Preferably, the one or more longitudinal metal elements are made of metal, preferably of steel.

Advantageously, the one or more longitudinal metal elements may be distributed regularly in the layer of concrete, in order to apply a uniform prestress to the layer of concrete.

When the one or more longitudinal metal elements are chosen to have a tubular shape, they have a sealing function. In this case, the tank does not include an additional sealing layer.

Sealing Layer

The sealing layer is intended to contain the gas, for example air, in the tank at all times. Only the connections (means for injecting and withdrawing the pressurized gas) of the tank need to influence the quantity of material present in the tank.

According to one embodiment variant, the sealing layer may be ensured by a first sublayer made of concrete followed by a sublayer made of metal, preferably of steel. The first sublayer made of concrete has the role of protecting the internal face of the sublayer made of steel against the at least one of physical and chemical damage (notably corrosion), preventing this same sublayer from collapsing (because of the prestresses applied to the steel wires) and, in general, withstanding the stress induced by the pressurized fluid.

According to an alternative, the sealing layer may be ensured directly by a layer of metal, preferably steel, that withstands at least one of the stresses, physical and chemical damage brought about by the medium in contact.

Alternatively, for the two embodiment variants described above, the layer of metal or the sublayer of metal may be replaced directly by a layer or sublayer of polymer that withstands the stresses and at least one of physical and chemical damage brought about by the medium in contact (the pressurized fluid). Polytetrafluoroethylene PTFE may be mentioned, for example. Making the sublayer from polymer makes it possible to reduce the weight and the cost of the sealing layer, while making the sublayer from metal provides better mechanical characteristics.

In one particular embodiment of the invention, the axial mechanical reinforcing layer and the sealing layer are formed by one and the same element made up of a steel tube.

Protective Layer for the Main Section

It will be recalled that this is an optional layer in the design of the main section of the tank. The external protective layer is intended to preserve the circumferential metal elements, and the layer of UHPC concrete, of the tank according to the invention against at least one of chemical attack (of the corrosion type) and physical attack. As a result, the external protective layer may be made of concrete, for example regular concrete, cement mortar, asphalt, polymer or any other material that provides protection against at least one of chemical and physical attack. This protective layer is consequently particularly advantageous when the layer of prestressed concrete comprises circumferential metal elements at its periphery. Advantageously, it is possible for this layer not to have a mechanical strength function. For this reason, this layer may be less thick that the layer of prestressed concrete.

Figure 2:
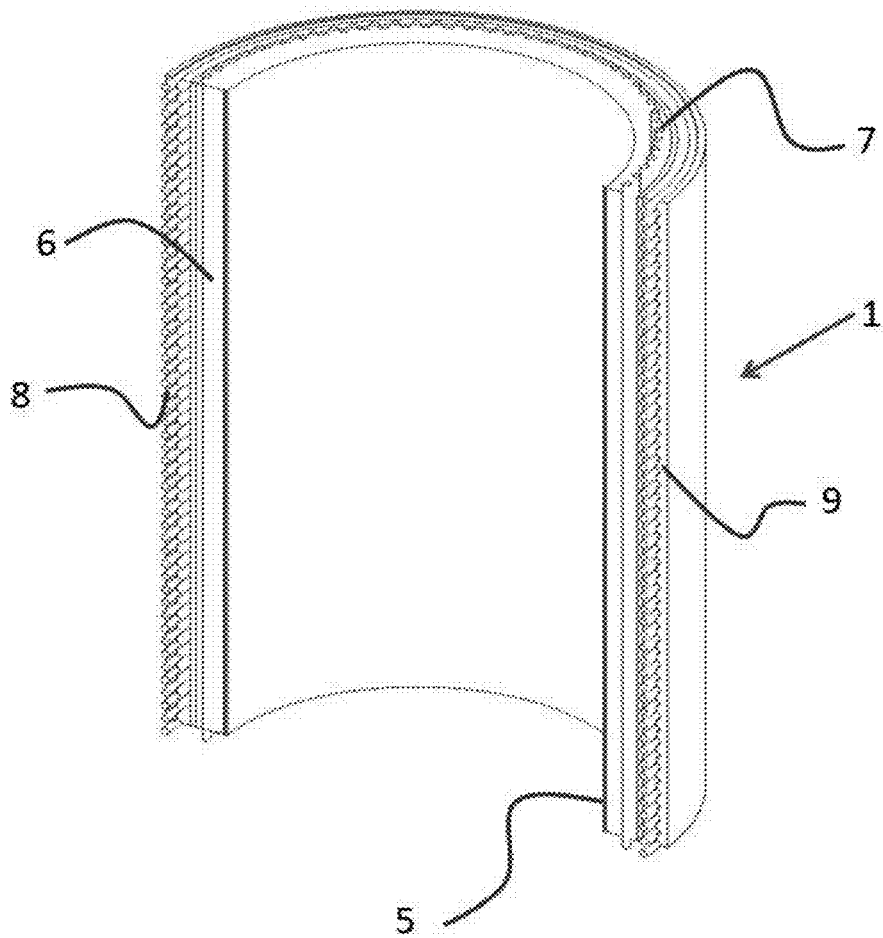
FIG. 2, FIG. 3 and FIG. 4 illustrate the main section of a tank according to different embodiments of the invention.
Figure 3:
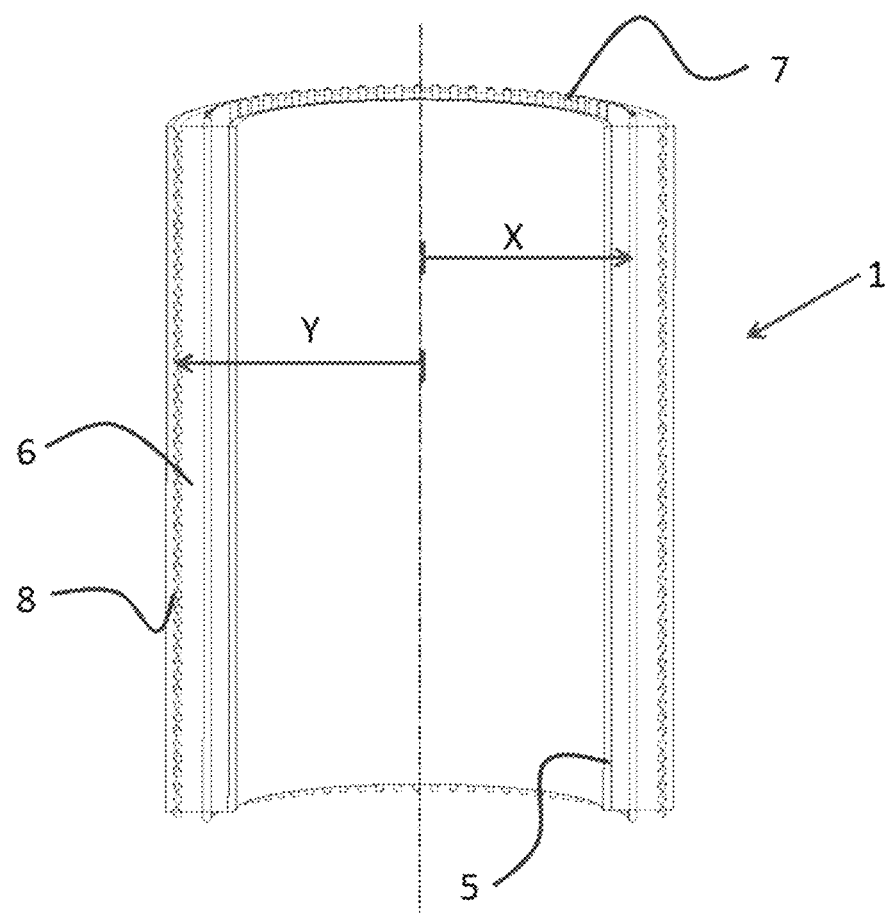
Figure 4:
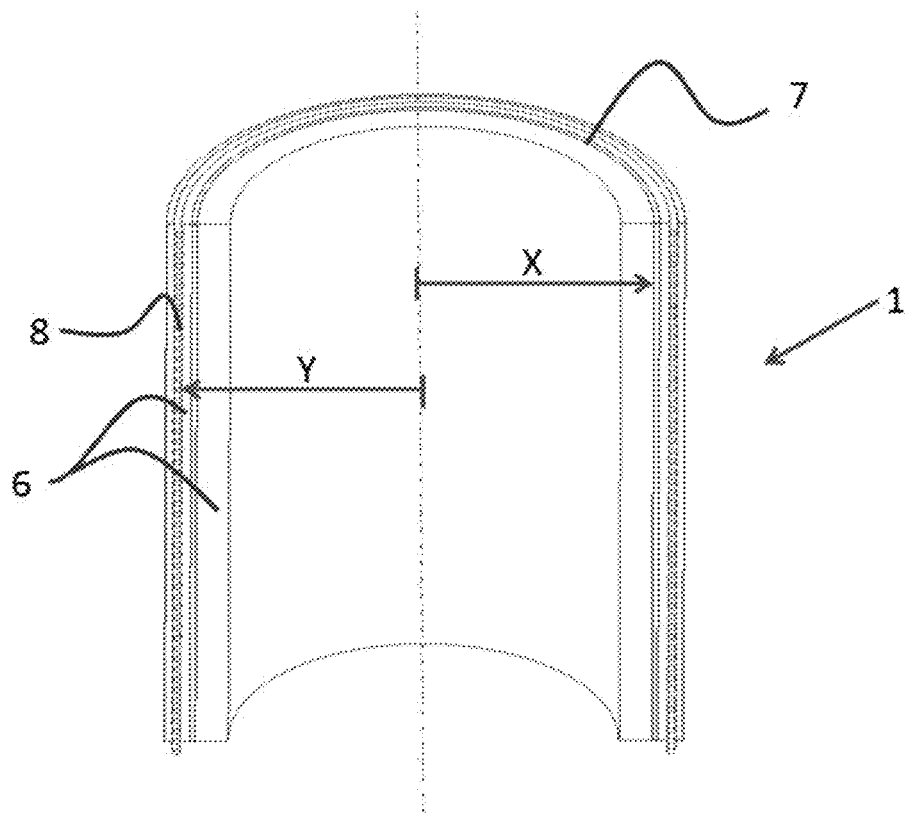

FIGS. 2, 3 and 4 illustrate, schematically and in a non-limiting manner, a main section 1 of a tank according to three embodiments of the invention. Each of FIGS. 2, 3 and 4 is a three-dimensional view in cross section of the main section 1.

With reference to FIG. 2, from the inside to the outside of the main section 1, the main section comprises a sealing layer 5, a mechanical strength layer 6 made of UHPC concrete covered with a circumferential mechanical reinforcing layer 8, and a protective layer 9. The circumferential mechanical reinforcing layer 8 is made up of metal wires under tensile prestress that are wound around the mechanical strength layer 6. Moreover, the mechanical strength layer 6 is traversed by metal wires 7 that make up the axial mechanical reinforcing layer. The metal wires 7 are under tensile prestress. The metal wires that make up the circumferential mechanical reinforcing layer 8 are distributed regularly along the length of the main section 1, and the metal wires that make up the axial mechanical reinforcing layer 7 are distributed regularly around the circumference of the main section 1. The protective layer 9, made for example of cement mortar, serves notably to protect the prestressed metal wires of the layer 8 from corrosion. The sealing layer 5 is pressed against the internal wall of the mechanical strength layer 6.

With reference to FIG. 3, from the inside to the outside of the main section 1, the main section comprises a sealing layer 5, a mechanical strength layer 6 made of UHPC concrete, a circumferential mechanical reinforcing layer 8 disposed within the UHPC concrete of the mechanical strength layer 6. Moreover, the mechanical strength layer 6 is traversed by metal wires 7 that make up the axial mechanical reinforcing layer. The metal wires 7 are under tensile prestress. The metal wires 7 are disposed in the mechanical strength layer 6 at a distance X smaller than the distance Y of the metal wires 7 that make up the axial mechanical reinforcing layer, each of the distances X and Y being measured with respect to the axis of the tank. The metal wires that make up the circumferential mechanical reinforcing layer 8 are distributed regularly along the length of the main section 1, and the metal wires that make up the axial strength layer 8 are distributed regularly around the circumference of the main section 1.

With reference to FIG. 4, from the inside to the outside of the main section 1, the main section comprises a mechanical strength layer 6 made of UHPC concrete and a circumferential mechanical reinforcing layer 8 disposed within the UHPC concrete of the mechanical strength layer 6. Moreover, the mechanical strength layer 6 is traversed by a metal tube 7 that makes up the axial mechanical reinforcing layer. The metal tube 7 is under tensile prestress along the axis of the tank. The metal tube 7 has a radius with a value X less than the distance Y, this distance being measured with respect to the axis of the tank, at which the metal wires 8 that make up the circumferential mechanical reinforcing layer are disposed. The metal wires that make up the circumferential mechanical reinforcing layer 8 are distributed regularly along the length of the main section 1. In this embodiment, the metal tube 7 also has the function of ensuring the impermeability of the tank.

System and Method for Storing and Recovering Energy

The invention also relates to means for storing and recovering energy, comprising at least one compression means, at least one expansion means, at least one heat storage means and at least one pressurized-gas tank according to the invention. Specifically, the use of a pressurized-gas tank as described above is suited to the high pressures of the pressurized gas employed in such a system. Moreover, the tank according to the invention makes it possible to considerably reduce the cost of the pressurized-gas tank, this being particularly useful for the means for storing and recovering energy, the pressurized-gas tank being a significant cost factor for the means for storing and recovering energy. It is particularly suited to the operation of systems of the AACAES type.

The present invention also relates to a storage and recovery method using compressed gas, wherein the following steps are carried out:
a) a gas is compressed, notably by means of a compressor;
b) optionally, the compressed gas is cooled by exchange of heat, in particular in a heat storage means,
c) the optionally cooled compressed gas is stored, notably in a tank for storing a pressurized fluid according to the invention;
d) optionally, the stored compressed gas is warmed, by exchange of heat, in the heat storage means; and
e) the optionally warmed compressed gas is expanded to generate energy, for example by a turbine to produce electrical energy.

Figure 5:
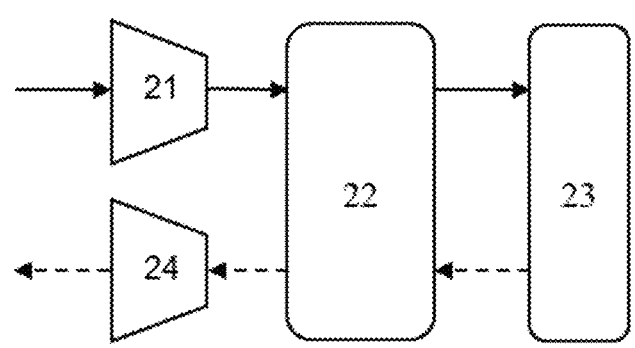
FIG. 5 depicts an exemplary embodiment of a storage and recovery system using compressed gas according to the invention employing a tank for storing pressurized gas according to the invention.

FIG. 5 illustrates a nonlimiting example of a system for storing and recovering energy using compressed gas according to the invention, having a gas compression means 21, a heat storage means 22, a pressurized-gas storage tank 23 according to the invention and a gas-expansion means 24. In this Figure, the arrows drawn in continuous line illustrate the circulation of the gas during the compression (energy storage) steps, and the arrows drawn in dotted line illustrate the circulation of the gas during the expansion (energy recovery) steps. The heat storage system 22 is interposed between the compression/expansion means 21 or 24 and the tank 23 according to the invention. Conventionally, during an energy storage (compression) phase, the air is first of all compressed in the compressor 21, then optionally cooled in the heat storage system 22. The optionally cooled compressed gas is stored in the tank 23 according to the invention. The heat storage system 22 stores heat during the cooling of the gas compressed in the compression phase. During energy recovery (expansion), the compressed gas stored in the tank 23 according to the invention is optionally warmed up in the heat storage system 22. Next, in a conventional manner, the gas passes through an expansion means 24.

The system for storing and recovering energy using compressed gas according to the invention is not limited to the example in FIG. 5. Other configurations may be envisioned: several compression and/or expansion stages, the use of reversible means to perform compression and expansion, etc.

EXAMPLES

The features and advantages of the tank according to the invention will become more clearly apparent from reading the embodiments and comparative examples set out below.

On the basis of analytical dimensioning formulas, characteristic dimensions for tanks made of regular concrete and of UHPC will be provided, in two dimensioning cases: with or without the integrity of the sealing layer being ensured:

R1A: tank made of regular concrete, integrity of the sealing layer ensured

R1B: tank made of regular concrete, integrity of the sealing layer not ensured

R2A: tank made of UHPC according to the invention, integrity of the sealing layer ensured R2B: tank made of UHPC according to the invention, integrity of the sealing layer not ensured For all of these tanks, the thickness of concrete and the quantity and distribution of the circumferential and axial metal elements have been established depending on the expected maximum operating pressure, which has been set at 125 bar, and taking into account the regulations provided by the Eurocodes, in particular Eurocode 4. The volumes of material used are calculated on the basis of a 5000 m3 tank. Only the tubular section is taken into account (no estimate of the needs relating to the bottom of the tank, or the civil engineering for supporting the structure).

The tanks dimensioned without the sealing layer being ensured are thicker and use more prestressing steel, inasmuch as greater prestress needs to be imposed on the concrete so as to ensure the absence of tensile stresses even in the event of pressurization of the internal porosity by the pressurized gas of the tank, at the maximum operating pressure (125 bar).

Numerical calculations simulating a drop in prestress were carried out in the case of a tank R1A made of regular concrete with integrity of the sealing layer (example 1) and of a tank R2A made of UHPC concrete according to the invention with integrity of the sealing layer (example 2). The examples were carried out by numerical simulation involving finite elements by means of the Abaqus software (software published by Dassault Systemes, France).

The main features of the tanks R1A and R2A (with the sealing layer being ensured) are:

TABLE 2

| | Tank R1A | Tank R2A |
| --- | --- | --- |
| Concrete | Regular concrete class C60/75 (compressive strength: 70 MPa. Tensile strength: 5 MPa) | UHPC concrete class UHPC175/190 (compressive strength: 180 MPa. Tensile strength: 12 MPa, limited strain hardening (class T2)) |
| Interior volume of the tank | 5000 m$^3$ | 5000 m$^3$ |
| Inside diameter of the tank | 2 m | 2 m |
| Thickness of the layer of concrete | 30 cm | 9 cm |
| Mass of the layer of concrete | 6700 tons | 2120 tons |
| Total section of the cables making up the circumferential metal elements (in cm$^2$ per linear meter of tank) | 86 cm$^2$/m | 83 cm$^2$/m |
| Total section of the cables making up the longitudinal metal elements | 273 cm$^2$ | 253 cm$^2$ |
| Total mass of the steel cables | 1140 tons | 1020 tons |
| Prestress applied in the metal elements | 1430 MPa | 1430 MPa |

The main features of the tanks R1B and R2B (without the sealing layer being ensured) are:

TABLE 3

|  | Tank R1B | Tank R2B |
|---|---|---|
| Concrete | Regular concrete class C60/75 (compressive strength: 70 MPa. Tensile strength: 5 MPa) | UHPC concrete class UHPC175/190 (compressive strength: 180 MPa. Tensile strength: 12 MPa, limited strain hardening (class T2)) |
| Interior volume of the tank | 5000 m$^3$ | 5000 m$^3$ |
| Inside diameter of the tank | 2 m | 2 m |
| Thickness of the layer of concrete | 48 cm | 11 cm |
| Mass of the layer of concrete | 13 300 tons | 2625 tons |
| Total section of the cables making up the circumferential metal elements (in cm$^2$ per linear meter of tank) | 139 cm$^2$/m | 102 cm$^2$/m |
| Total section of the cables making up the longitudinal metal elements | 649 cm$^2$ | 358 cm$^2$ |
| Total mass of the steel cables | 2190 tons | 1320 tons |
| Prestress applied in the metal elements | 1430 MPa | 1430 MPa |

In the case in which the integrity of the sealing layer is ensured, the present example shows that the structure of the tank R2A is lighter than that of the tank R1A. The concrete mass required is much lower on account of the much better properties of the UHPC concrete. In a more limited manner, these high mechanical strengths also make it possible reduction of the volumes of prestressing metal reinforcements that are necessary by around 10%.

This advantage is augmented in the case in which the integrity of the sealing layer can no longer be ensured, as illustrated in the present example. In both cases, the needs for concrete and prestressing steel are increased compared with the case in which the sealing layer is ensured. However, the increase is much greater in the case of conventional concrete (tank R1B), be this in terms of concrete or of prestressing steel. The needs for prestressing steel, in particular, become notably lower in the case of the tank made of UHPC according to the invention (tank R2B).

In the case in which the integrity of the sealing layer is ensured, the present example shows that the structure of the tank R2A is more expensive than the structure of the tank R1A: the excess in terms of materials is evaluated as being +36%. This difference is relatively limited in spite of the fact that the UHPC concrete has a price estimated to be around 10 times higher than conventional concrete, since this excess is partially compensated by the much lower required volumes of concrete, and the savings of steel on the prestressing elements.

In the case in which the integrity of the sealing layer is not ensured, the costs increase, by 86% for the solution using conventional concrete, and by 26% for the solution using UHPC according to the invention, These variations, surprisingly, bring about much greater competitiveness of the tank made of UHPC concrete according to the invention, which becomes 8% more economical than the solution using conventional concrete in this scenario.

Figure 6:
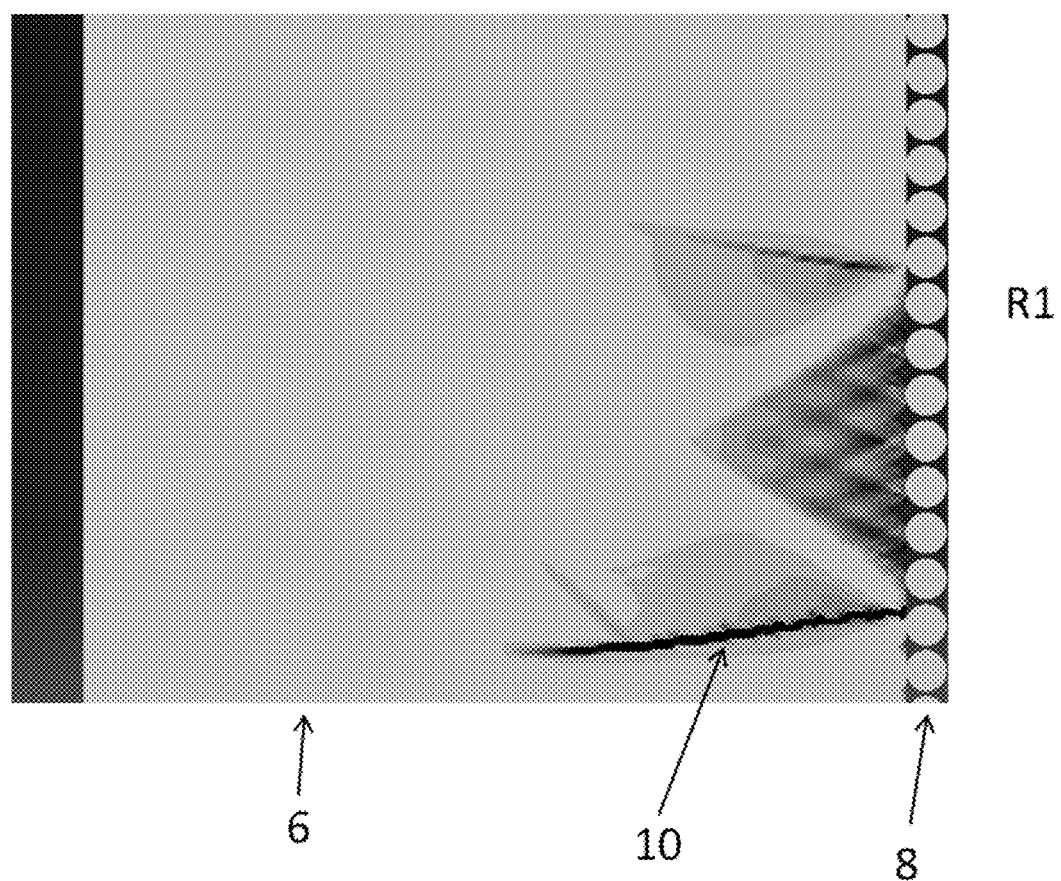
FIG. 6 and FIG. 7, respectively, show the results of numerical simulations of the behavior of a tank with a layer of regular concrete and, respectively, of a tank according to the invention in the event of breakage of longitudinal metal elements.
Figure 7:
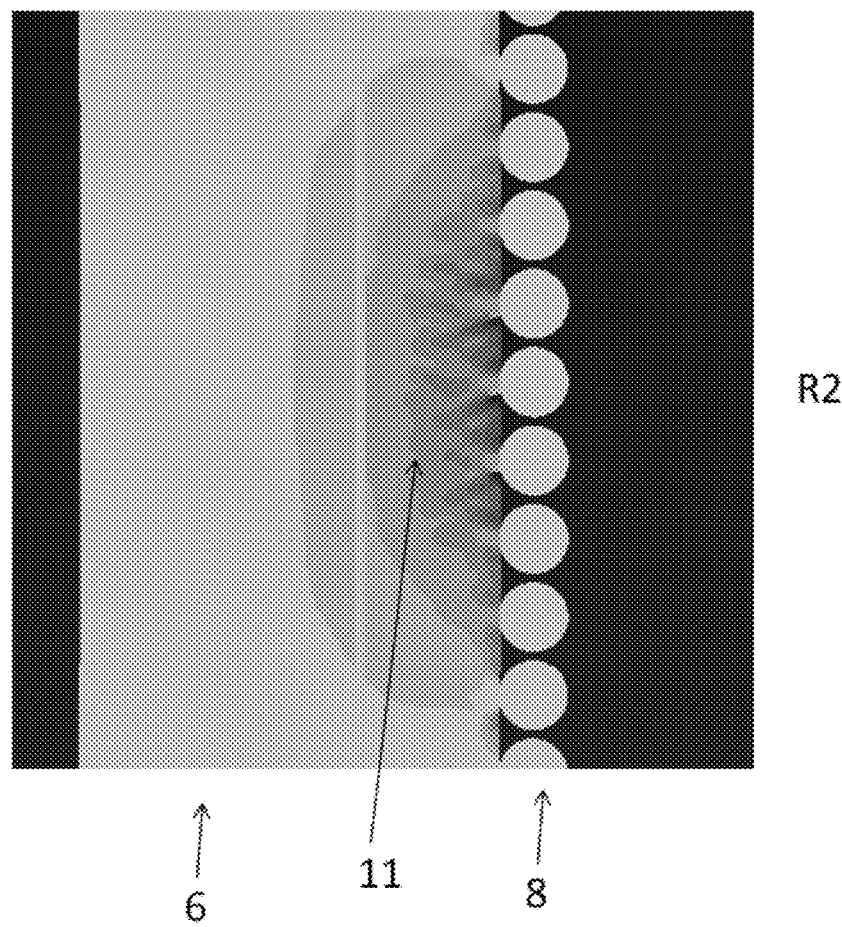

Examples 1 and 2 present the results of numerical simulations run in the case of simultaneous ruptures of seven circumferential metal elements, at the maximum operating pressure of 125 bar for the tanks R1A and R2A, respectively. FIGS. 6 and 7 present, for the tanks R1A and R2A, respectively, a cross section through the thickness of the layers of the tank, on a longitudinal plane. FIGS. 6 and 7 show only the layer of prestressed concrete 6 and the circumferential mechanical reinforcing layer 8 which is made up of steel cables. The left-hand side of FIGS. 6 and 7 corresponds to the center of the tank and the right-hand side of FIGS. 6 and 7 corresponds to the outside of the tank. In the layer of concrete shown in FIGS. 6 and 7, the gray fields represent the plastic deformation which corresponds to the cracking of the concrete.

The difference in behavior between the regular concrete of the tank R1A and the UHPC concrete of the tank R2A is immediately apparent. In FIG. 6, the formation of a crack 10 at the border of the damaged zone, which propagates toward the interior of the tank, can be seen in the layer of regular concrete of the tank R1A. This crack is liable to bring about a rupture and imperil the integrity of the structure. In FIG. 7, damage (in the zone 11) that is more limited and diffuse and remains confined to the exterior surface of the layer of prestressed concrete can be seen in the layer of UHPC concrete of the tank R2A. Moreover, the concrete preserves a larger part of its mechanical capacity in FIG. 7 compared with FIG. 6. Consequently, beyond the mechanical performance due to the UHPC concrete, the use of UHPC concrete in the context of use for a tank for storing energy in the form of pressurized gas makes it possible, unexpectedly, to increase the resilience of the tank.

The invention claimed is:

1. A tank for storing a pressurized gas, the tank comprising:
   at least one tubular element having a wall having a layer of prestressed concrete, at least one circumferential mechanical reinforcing layer and a sealing layer, with the concrete that makes up the layer of prestressed concrete being chosen from ultra-high performance fiber-reinforced concretes;
   a base closing the at least one tubular element at one end of the at least one tubular element; and
   a cover closing the at least one tubular element at another end of the at least one tubular element opposite the one end,
   wherein the concrete of the layer of prestressed concrete is chosen from ultra-high performance fiber-reinforced concretes meeting at least one of:
   the prestressed concrete has fines of different sizes, the maximum size of the fines being less than 7 mm, and the content of fines having a grain size d50<5 μm being at least greater than 50 kg/m$^3$ of concrete;
   a content of cement of between 700 and 1000 kg/m$^3$ of concrete;
   a water/cement mass ratio of between 0.15 and 0.25;
   a content of solid additives between 10 and 35 kg/m$^3$ of concrete; and
   a content of fibers of between 2% and 10% by volume.

2. The tank as claimed in claim 1, wherein the concrete of the layer of prestressed concrete is chosen from ultra-high performance fiber-reinforced concretes defined by the standard NF P18-470.

3. The tank as claimed in claim 2, wherein the concrete of the layer of prestressed concrete is chosen from ultra-high performance fiber-reinforced concretes defined by the standard NF P18-470 having metal fibers made of steel and exhibiting a standardized compressive strength greater than 150 MPa.

4. The tank as claimed in claim 3, wherein the concrete of the layer of prestressed concrete is chosen from ultra-high performance fiber-reinforced concretes having metal fibers made of steel and exhibiting a tensile behavior defined in accordance with NF P18-470.

5. The tank as claimed in claim 1, wherein the circumferential mechanical reinforcing layer is made with circumferential metal elements disposed around or in the layer of prestressed concrete with the circumferential metal elements being under tensile prestress.

6. The tank as claimed in claim 5, wherein the circumferential metal elements are chosen from metal wires, metal bands, metal rings, and metal cables.

7. The tank as claimed in claim 1, wherein the wall also has a protective layer disposed on the external surface of the layer of prestressed concrete and the circumferential mechanical reinforcing layer is embedded in the protective layer.

8. The tank as claimed in claim 1, wherein the wall also has at least one axial mechanical reinforcing layer made up of at least one longitudinal metal element disposed in the layer of prestressed concrete, with one or more longitudinal metal elements under tensile prestress.

9. The tank as claimed in claim 8, wherein the at least one longitudinal metal element is chosen from a metal tube, metal wires, metal cables and metal bands.

10. The tank as claimed in claim 1, wherein the sealing layer is chosen from a layer of metal, a layer of polymer, an internal sublayer of concrete and an external sublayer of metal or polytetrafluoroethylene.

11. The tank as claimed in claim 1, wherein at least the layer of prestressed concrete and the circumferential metal reinforcing layer are dimensioned to withstand a pressure at least greater than 100 bar and having an interior volume of at least 1000 m$^3$.

12. A system for storing and recovering energy using compressed gas, having at least one means for compressing gas, at least one tank for storing pressurized gas as claimed in claim 1, and at least one means for expanding the compressed gas to generate energy.

13. A method for storing and recovering energy using compressed gas, comprising steps of:
    a) compressing a gas;
    b) cooling the compressed gas by exchange of heat in a heat storage means;
    c) storing the cooled gas in a tank for storing a pressurized gas as claimed in claim 1;
    d) warming the cooled compressed gas by restitution of the heat in the heat storage; and
    e) warmed compressed gas is expanded to generate energy.

14. The tank as claimed in claim 1, wherein the at least one tubular element is closed at opposing sides by a base and a cover.

15. The tank as claimed in claim 14, wherein the at least one tubular element has a cylindrical shape of circular section.

16. The tank as claimed in claim 14, wherein the tank has a storage volume greater than 1000 m$^3$.

17. The tank as claimed in claim 1, wherein the tank has a storage volume greater than 1000 m$^3$.

18. The tank as claimed in claim 14, wherein the tank has a storage volume between 2000 m$^3$ and 10,000 m$^3$.

19. The tank as claimed in claim 1, wherein the tank has a storage volume between 2000 m$^3$ and 10,000 m$^3$.

* * * * *